Figure 1:
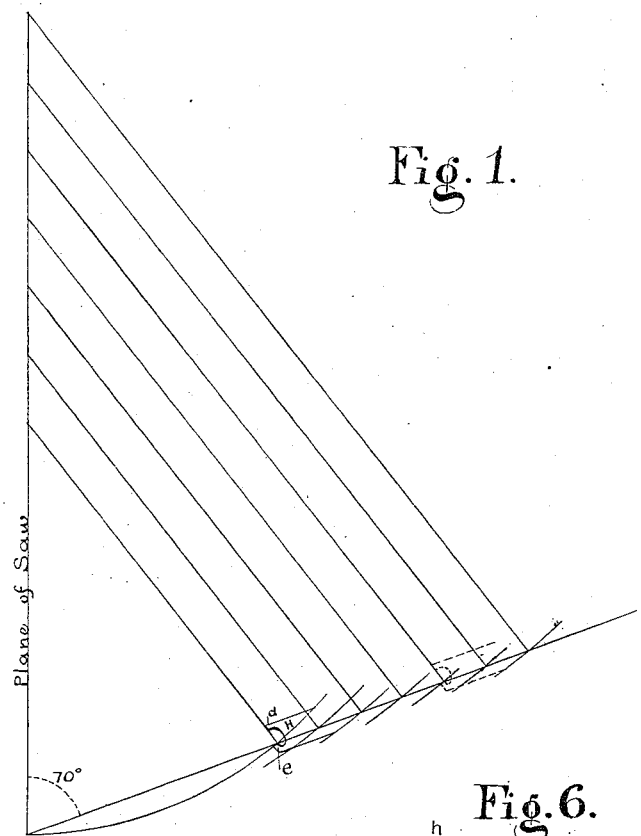

(No Model.) 3 Sheets—Sheet 1.

I. V. ROY.
CIRCULAR SAWING MACHINE.

No. 354,811. Patented Dec. 21, 1886.

Witnesses:
J. B. McGinn.
P. McGinn.

Inventor:
I. V. Roy
By his att'y
A. D. Smith (No Model.) 3 Sheets—Sheet 2.

I. V. ROY.
CIRCULAR SAWING MACHINE.

No. 354,811. Patented Dec. 21, 1886.

Witnesses:
J. B. McGiv.
P. McGiv.

Inventor:
J. V. Roy
By his atty
R. D. O. Smith

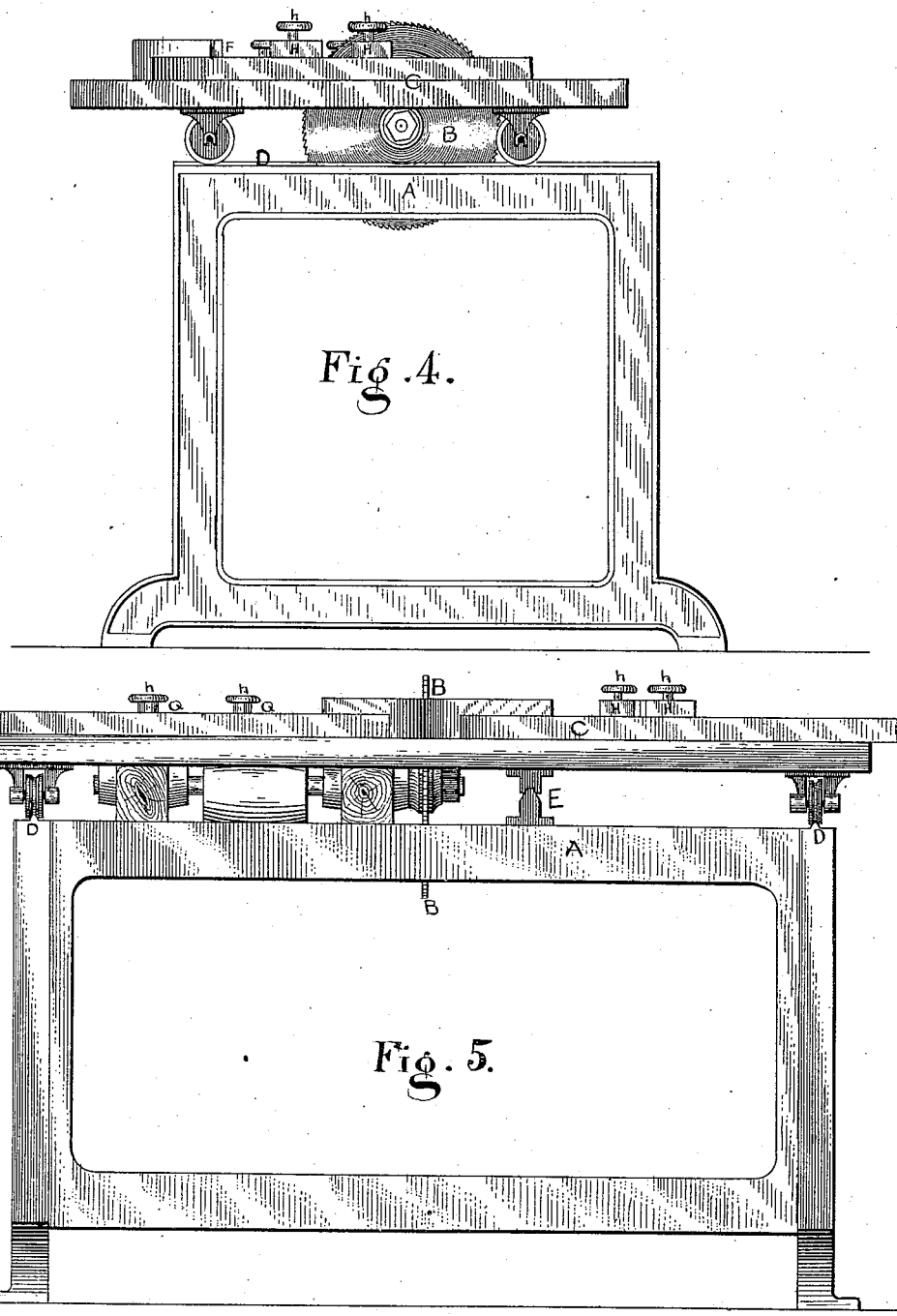

UNITED STATES PATENT OFFICE.

ISIDORE V. ROY, OF MISHAWAKA, INDIANA, ASSIGNOR TO THE DODGE MANUFACTURING COMPANY, OF SAME PLACE.

CIRCULAR-SAWING MACHINE.

SPECIFICATION forming part of Letters Patent No. 354,811, dated December 21, 1886.

Application filed August 4, 1886. Serial No. 209,981. (No model.)

*To all whom it may concern:*

Be it known that I, ISIDORE V. ROY, of Mishawaka, in the county of St. Joseph and State of Indiana, have invented new and useful Improvements in Machinery for Radially Sawing Curved Segments for Wooden Pulleys; and I do hereby declare that the following is a full and accurate description of the same.

Wooden pulleys are built up by rigidly securing to each other a series of curved segments cut from suitable boards or planks and so placed as to lap or break joints. In the manufacture of such pulleys the curved segments are cut from boards or planks with a band or jig saw approximately true, but exceeding final dimensions. Small pulleys only require four segments to complete the circumference of the circle; but larger pulleys require a larger number. The ends of each segment must necessarily be cut accurately to the radius of the peripheral curve of the finished pulley, and the length of each segment must accurately conform to the predetermined subdivision of the peripheral circle.

The object of this invention is to accurately gage the position of each segment as it is presented to the radial saw, so that the operator may saw the ends of the segments accurately as to radius and length without the use of templets or other means for individually marking the segments before sawing; and it therefore consists in a saw and a saw-table relatively movable in parallelism with the plane of the saw, and a permanent gage-block attached to said table close to the plane of the saw, and two movable gages, one of which is adjusted to include between itself and said permanent gage an arc of some desired circle, the center whereof is in the plane of the saw, and the other of said movable gages includes with said permanent gage not only the same arc, but also the exact angular length of some desired segment of said circle, whereby when a curved wooden segment is placed in contact with the permanent gage and the first-named movable gage and presented to the saw it will be cut on a line radial to the peripheral curve of the pulley, and when placed on the permanent gage and the second-named movable gage and presented to the radial saw it will be cut not only on said radial line, but also to the length of the desired equal division of said peripheral circle. The two movable gages may be combined on one movable block; but it is more convenient to have them separate, as herein shown.

Figure 6:
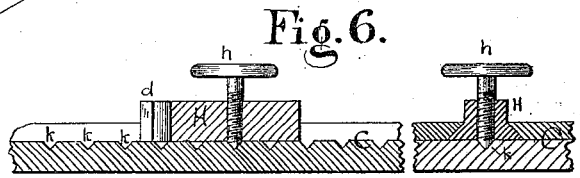
Figure 7:
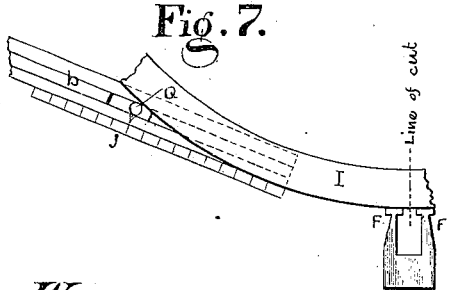
Figure 8:
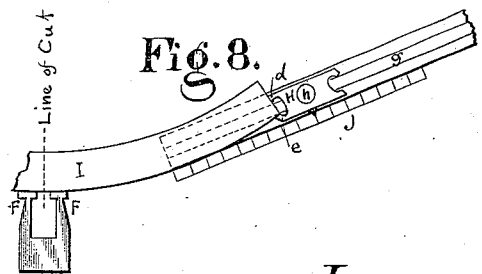
Figure 2:
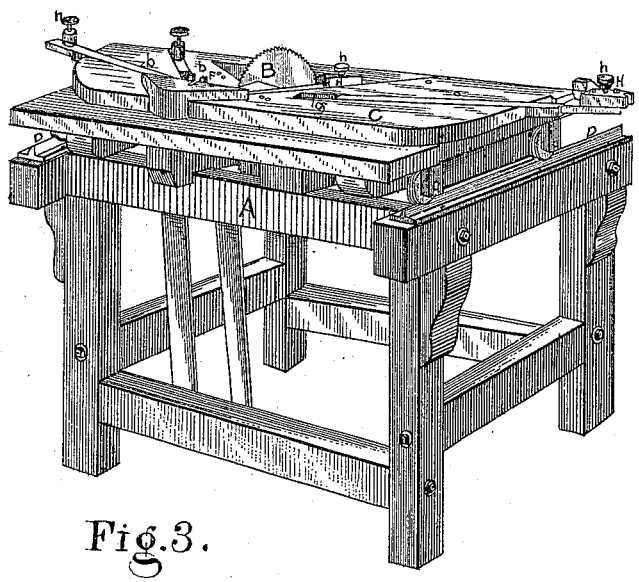
Figure 3:
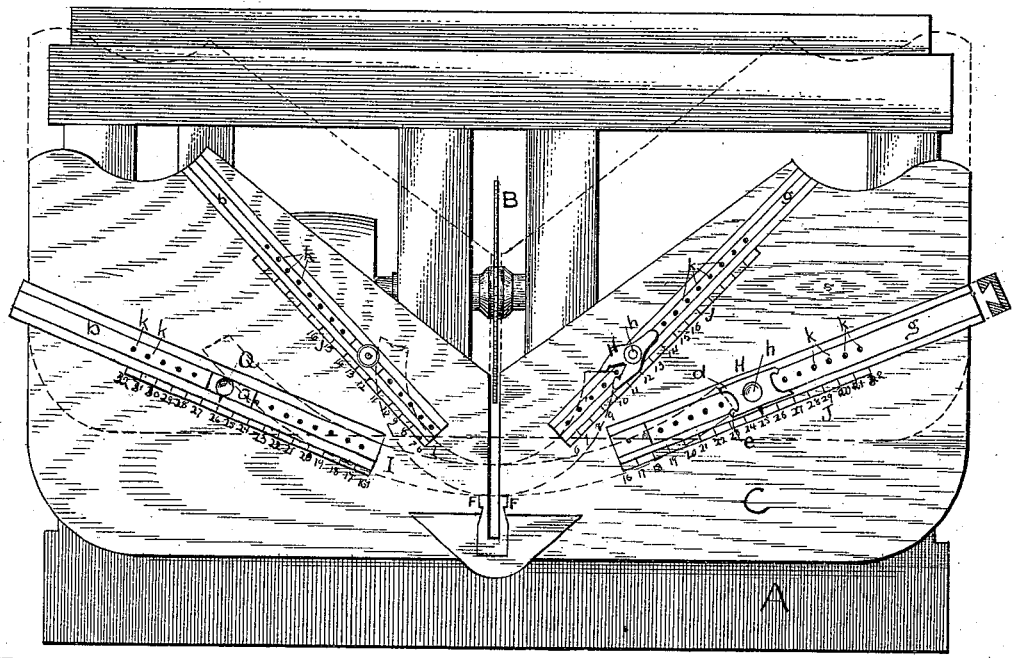

In the accompanying drawings, Figure 1 is a diagrammatic illustration of my invention. Fig. 2 is a perspective view of the machine which I have constructed embodying my invention and adapted to the cutting of the wooden segments for wooden pulleys. Fig. 3 is a plan of the same. Fig. 4 is an end elevation of the saw-table. Fig. 5 is a front elevation of the same. Figs. 6, 7, and 8 are detail views showing the manner of adjusting the gages.

It will now be observed that the machine shown in the drawings above referred to is designed for working the wooden segments used in the manufacture of wooden pulleys, and is adapted to the particular requirements of that service, which will hereinafter be explained, and that the particular forms and arrangements are important, practically, for this particular service, but not theoretically important to the invention, and for other analogous services the details of structure may be varied.

The wooden segments are first marked out by templet and are sawed approximately true to curve. The form of the outer and inner curves of the segment is important, because after being assembled they are turned true; but the ends must be accurately radial and the segment must be of exact length or the transverse joints will not be true or in proper place. Owing to the fact that the wooden segments are only approximately true as to curve, and that changes of atmospheric conditions will cause a corresponding and continuous change of the form of said segments, it is important to arrange the permanent gage-point as near to the plane of the saw as possible, and to adapt the movable gage-block to segments of the same angular arc, so that in use each segment will be gaged at points as near as possible to its ends, and thereby slight variation or irregularities in form of the segment will not disturb the true radial direction of the saw-cut.

It is therefore convenient to arrange separate sets of gage-points for each series of segments having the same angular arc.

A is the saw-bench, constructed in any suitable way and of any suitable material. Preferably it is of iron and carries the bearings for the arbor of the saw B.

The saw-table C is movable on ways D, as is usual, in parallelism with the plane of the saw. A guide, E, close to the plane of the saw insures steadiness and truth of movement. (See Fig. 5.) At the front edge the table C is provided with the fixed gage-block F, close to the plane of the saw. At one side there is the movable gage-block G, set for curvature, and at the other side the movable gage-block H, set for both curvature and length. If the machine were employed solely on segments of the same curvature and length, these gage-blocks might all be fixed; but in practice it would seldom be desirable to limit the use of a machine in that way, and I therefore make these gages movable along a certain line oblique to the plane of the saw, and they may then be adjusted to gage the segments having the same angular arc for circles of any diameter within the capacity of the machine.

The gage-block G is merely a pin mounted on a slide, a, moving in a groove, b, and capable of being fixed at any point desired. The convex side of the segment I rests against the gage-blocks G and F, and when presented to the saw B its end is cut on the radius of the curve.

The gage-block H is bifurcated and moves in a groove, g, with a set-screw to fix it in plane. The prong d and pin G are substantially equidistant from the gage F, and also substantially equidistant from the plane of the saw. The prong e is distant from the plane of the saw at the gage F exactly equal to the desired subdivision of the pulley's periphery, so that when the end of segment I already cut to radius rests against the prong e, while the convex edge of said segment rests against the gage F and prong d, if presented to the saw, the segment will be cut exactly to length, with both ends truly radial.

Scales J of radii may be inscribed along the grooves b and g, indicating the proper positions for the movable gages for the lengths of segments for pulleys of different diameters, and the point of the set-screws h in the slide H may be arranged to enter the slight but accurately-spaced cell k and accurately and securely lock the slide H in position.

As stated above, it is more desirable and convenient to provide separate gages for segments of different angular arcs, so that said segments may be gaged at points near to their ends, and it will be convenient to arrange two or more sets upon the same saw-table, as shown in Fig. 4.

The angular directions of the several grooves b g for the gage-blocks to the plane of the saw, using the gage F as a datum, is as follows: for four segments to complete the circle, forty-five degrees; for six segments to complete the circle, sixty degrees; for seven segments to complete the circle, 64.17 degrees; for eight segments to complete the circle, 67.5 degrees; for nine segments to complete the circle, seventy degrees; for ten segments to complete the circle, seventy-two degrees; for eleven segments to complete the circle, 73.38 degrees; for twelve segments to complete the circle, seventy-five degrees, and so on.

Having described my invention, I claim as new—

1. A saw and a saw-table relatively movable, combined with a gage-block permanently fixed to said table near the plane of the saw, and movable gage-blocks adjustable on said table along fixed lines oblique to the plane of the saw and as to said permanent gage, to adapt them to the peripheral curvature and length of segments, substantially as set forth.

2. A saw, B, and a saw-table, C, relatively movable, combined with the gage-block F, permanently fixed to said saw-table, and the movable gage-blocks G and H and grooves b g, wherein said blocks are separately adjustable along fixed lines oblique to the plane of the saw, to adapt them to gage the wooden segments I to cause said saw to cut the ends of the same radial to the peripheral curve and to the proper segmental length, as set forth.

3. The movable saw-table C, provided with the fixed gage F, and the gage-groove oblique to the plane of the saw, said groove being provided with a series of pits, k k, equally spaced, combined with an adjustable gage-block fitted to move in said groove, and provided with the pointed set-screws h.

ISIDORE V. ROY.

Witnesses:
W. H. DODGE,
JOHN J. SCHINDLER.